(12) United States Patent
Wenzel

(10) Patent No.: US 6,326,445 B1
(45) Date of Patent: Dec. 4, 2001

(54) CATALYST COMPOSITION FOR THE POLYMERIZATION OF OLEFINS

(75) Inventor: Timothy Todd Wenzel, Charleston, WV (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/512,142

(22) Filed: Feb. 23, 2000

Related U.S. Application Data

(62) Division of application No. 08/999,148, filed on Dec. 29, 1997, now Pat. No. 6,054,405.

(51) Int. Cl.[7] ............................. C08F 4/44; C08F 4/64; C08F 4/642
(52) U.S. Cl. ..................... 526/160; 526/161; 526/172; 526/901
(58) Field of Search ................................. 526/160, 161, 526/172

(56) References Cited

U.S. PATENT DOCUMENTS

| | | | | |
|---|---|---|---|---|
| 3,394,118 | * | 7/1968 | Boor et al. ...................... | 260/93.7 |
| 5,158,920 | | 10/1992 | Razavi ............................ | 502/152 |
| 5,331,071 | | 7/1994 | Kataoka et al. ................. | 526/128 |
| 5,387,567 | | 2/1995 | Tajima et al. ................... | 502/103 |
| 5,416,179 | | 5/1995 | Welch et al. .................... | 526/160 |
| 5,451,555 | | 9/1995 | Tajima et al. ................... | 502/103 |
| 5,631,202 | | 5/1997 | Ewen ............................... | 502/117 |
| 5,631,203 | | 5/1997 | Welch et al. .................... | 502/152 |
| 5,747,406 | * | 5/1998 | Reichle et al. .................. | 502/117 |

FOREIGN PATENT DOCUMENTS

0704454A2  9/1995  (EP).

\* cited by examiner

*Primary Examiner*—David W. Wu
*Assistant Examiner*—R. Rabago

(57) ABSTRACT

A catalyst composition for the polymerization of olefins is provided, which comprises the reaction product of a fulvene, a complex of an atom selected from Groups 3–14 and the Lanthanides, and an activating cocatalyst.

20 Claims, No Drawings

CATALYST COMPOSITION FOR THE POLYMERIZATION OF OLEFINS

CROSS REFERENCE STATEMENT

This application is a divisional of U.S. Ser. No. 08/999,148, filed Dec. 29, 1997, now U.S. Pat No. 6,054,405.

The present invention provides a catalyst composition for the polymerization of olefins, which comprises the reaction product of a fulvene, a complex of an atom selected from Groups 3–14 and the Lanthanides, and an activating cocatalyst.

BACKGROUND OF THE INVENTION

In the field of single-site polymerization of olefins, typical catalyst compositions comprise organometallic catalysts such as metallocenes contacted with activating cocatalysts such as alumoxanes. The synthesis and isolation of metallocenes can be difficult due to their air and moisture sensitivity. Yields are often poor with more complex kinds of catalysts. Thus, catalyst cost can be substantial. Moreover, it is difficult to change substantially the rates and product properties of these catalysts once they have been made, since the ligand of the catalyst exerts overwhelming control over the catalyst composition properties. Thus, such catalysts are not especially amenable to processes using a variety of conditions or producing a variety of products.

Catalyst compositions that can be assembled at the site of the reactor are advantageous in terms of cost because isolation and purification is avoided. Moreover, catalysts previously considered non-isolable or catalysts that could not even be made in impure form can be readily made by self-assembly. Self-assembled catalyst compositions can also be extremely versatile. Catalyst composition properties can be tuned by adjusting the various components of the catalyst composition.

U.S. Pat. Nos. 5,378,567 and 5,451,555 to Tajima et al. relate to catalyst compositions for the homopolymerization or copolymerization of olefins. The catalyst compositions comprise a first compound of the formula $Me^1(OR^1)_pR^2_qX^1_{4-p-q}$, wherein $Me^1$ is Ti, Zr, or Hf, a second compound of the formula $Me^2(OR^3)_mR^4_nX^2_{z-m-n}$, wherein $Me^2$ is a Group I–III metal, and a third compound that is an organocyclic compound having two or more conjugated double bonds. A variety of organocyclic compounds are described in these patents, none of which are fulvenes.

Similarly, U.S. Pat. No. 5,331,071 to Kataoka et al. describes a process for the polymerization of olefinic hydrocarbons carried out in the presence of a catalyst component derived from reacting a compound of the formula $Me^1R^1_nX^1_{4-n}$, wherein $Me^1$ is Ti, Zr, or Hf, a compound of the formula $Me^2R^2_mX^2_{z-m}$, wherein $Me^2$ is a Group I–III metal, an organocyclic compound having two or more conjugated double bonds, and an inert carrier, along with a modified organoaluminum compound having Al—O—Al bonds. Again, a variety of organocyclic compounds are described, none of which are fulvenes.

U.S. Pat. No. 5,158,920 to Razavi discloses a process for the preparation of a bridged metallocene catalyst. The bridged cyclopentadienyl ligand of the catalyst is made by reacting a cyclopentadiene with substituted fulvene. The ligand is isolated and then contacted with a transition metal halide or hydrocarbon compound to form the bridged metallocene catalyst. Cocatalyst is subsequently added.

Derwent Abstract 96-088466/10 for DE 4434640 relates to the in situ production of a bridged metallocene catalyst by reacting a cyclopentadiene with a base, a bridging reagent, and a metal compound. The resulting stereorigid catalyst may be used for the polymerization of olefins.

Applicant has now discovered a self-assembled catalyst composition that may be easily and cost effectively made. The catalyst composition comprises the reaction product of a fulvene, a complex of an atom selected from Groups 3–14 and the Lanthanides, and an activating cocatalyst. The catalyst composition may contain a solvent as well, and is preferably used in unsupported, liquid form. Isolation of the catalyst composition or intermediates thereto is not required. Combinations of different fulvenes, complexes of an atom selected from Groups 3–14 and the Lanthanides, and activating cocatalysts can lead to versatile catalyst compositions that can be altered on-stream to match product and process requirements. Conditions used during catalyst composition formation such as temperature and concentrations of the reactants also can be used to control the properties of the resulting catalyst composition and polymer product.

SUMMARY OF THE INVENTION

The invention provides a catalyst composition comprising the reaction product of:

a) a fulvene of the formula:

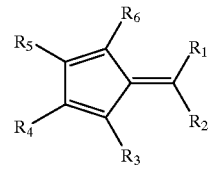

including oligomers thereof,
wherein each $R_1$, $R_2$, $R_3$, $R_4$, $R_5$, and $R_6$ is independently hydrogen, hydrocarbyl, or a heteroatom-containing group; and any two or more R groups may be joined to form a ring;

b) a complex of the formula $[L_mMX_n]_r$ wherein each L is a neutral ligand, M is an atom selected from Groups 3 to 14 and the Lanthanides, each X is an anionic group, m is an integer of 0 or greater, n is an integer of 0 or greater; and r is an integer of 1 or greater; and c) an activating cocatalyst.

The invention also provides a process for the polymerization of olefins, which comprises contacting under polymerization conditions olefin with a catalyst composition comprising the reaction product of.

a) a fulvene of the formula:

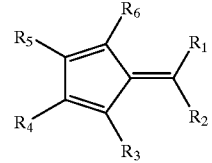

including oligomers thereof,
wherein each $R_1$, $R_2$, $R_3$, $R_4$, $R_5$, and $R_6$ is independently hydrogen, hydrocarbyl, or a heteroatom-containing group; and any two or more R groups may be joined to form a ring;

b) a complex of the formula $[L_mMX_n]_r$ wherein each L is a neutral ligand, M is an atom selected from Groups 3 to 14 and the Lanthanides, each X is an anionic group, m is an integer of 0 or greater, n is an integer of 0 or greater; and r is an integer of 1 or greater; and c) an activating cocatalyst.

DETAILED DESCRIPTION OF THE INVENTION

The catalyst composition comprises the reaction product of at least one fulvene, at least one complex of an atom selected from Groups 3–14 and the Lanthanides, and at least one activating cocatalyst.

The fulvene has the formula:

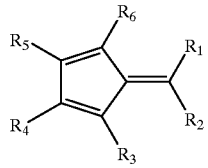

wherein each $R_1$, $R_2$, $R_3$, $R_4$, $R_5$, and $R_6$ is independently hydrogen; hydrocarbyl such as alkyl, aryl, alkenyl, or alkynyl; or a heteroatom-containing group such as alkoxy, aryloxy, amino, halo, a silicon atom, or silicon-containing group. A heteroatom-containing group is any group containing at least one atom that is not carbon or hydrogen. Preferably, any hydrocarbyl group contains from 1 to 50 carbon atoms. Similarly, any alkoxy or aryloxy group preferably contains from 1 to 50 carbon atoms. Any two or more R groups may be joined to form a ring. In the case of $R_3$ through $R_6$, two adjacent R groups may comprise one or more arene rings fused to the cyclopentadiene ring.

Furthermore, two or more such fulvene moieties can be linked by one or more linking groups such as hydrocarbyls or heteroatom-containing groups to form a dimer or other oligomer. As used herein, an oligomer of a fulvene means two or more fulvenes linked together by such linking groups.

Examples of fulvenes include fulvene, 6-methylfulvene, 6,6-dimethylfulvene, 6-phenylfulvene, 6-methyl-6-phenylfulvene, 6-t-butylfulvene, 6-benzylfulvene, 6,6-trimethylenefulvene, 6,6-tetramethylenefulvene, 6,6-pentamethylenefulvene, 6,6-hexamethylenefulvene, 2-norbornylidenecyclopentadiene, 2-adamantylidenecyclopentadiene, 3,6,6-trimethylfulvene, 3-t-butyl-6,6-dimethylfulvene, 3-methyl-6,6-pentamethylenefulvene, 1-isopropylideneindene, 1-ethylideneindene, 1-benzylideneindene, 9-isopropylidenefluorene, 6-vinylfulvene, 6,6-divinylfulvene, cyclopropenylidenecyclopentadiene, cyclopentadienylidenecyclopentadiene, cycloheptatrienylidenecyclopentadiene, and azulene.

Preferred fulvenes include 6-t-butylfulvene and 6,6-dialkylfulvenes such as 6,6-dimethylfulvene, 6-methyl-6-phenylfulvene, 6,6-tetramethylenefulvene, and 6,6-pentamethylenefulvene. Most preferred is 6,6-pentamethylenefulvene.

The fulvene may be made in any manner. One useful synthesis method from common precursors is described in Neuenschwander, M., *The Chemistry of Double-Bonded Functional Groups*; Patai, S. Ed.; John Wiley and Sons, Ltd. 1989. Another method of making the fulvene is given in Stone, K. J.; Little, R. D. *J. Org. Chem.* 1984, 49, 1849.

The complex of an atom selected from Groups 3–14 and the Lanthanides has the formula $[L_mMX_n]_r$. Each L is the same or different neutral ligand, such as $Et_2O$, tetrahydrofuran, $Et_3N$, or pyridine.

M is an atom selected from Groups 3 to 14 of the Periodic Table and the Lanthanides. Preferably, M is an element selected from Groups 3 to 6 and the Lanthanides. More preferably, M is a Group 4 element.

Each X is the same or different anionic group, such as halide, alkoxide, amide, hydrocarbyl, acetylacetonate, carboxylate, carbamate, amidate, or aluminate anion such as tetramethylaluminate or tetrachloroaluminate.

The letter m is an integer of 0 or greater, the letter n is an integer of 0 or greater; and the letter r is an integer of 1 or greater Examples of the complex of an atom selected from Groups 3–14 and the Lanthanides include titanium (IV) chloride, titanium (IV) bromide, titanium (IV) iodide, titanium (IV) diethylamide, titanium (IV) t-butoxide, titanium (IV) acetylacetonate, zirconium (IV) chloride, zirconium (IV) bromide, zirconium (IV) iodide, zirconium (IV) diethylamide, zirconium (IV) t-butoxide, zirconium tetrabenzyl, zirconium (IV) acetylacetonate, zirconium an perfluoroacetylacetonate, zirconium (IV) pivalate, zirconium (IV) diethylcarbamate, zirconium dichloride bis (acetylacetonate), hafnium (IV) chloride, hafnium (IV) bromide, hafnium (IV) iodide, hafnium (IV) diethylamide, hafnium (IV) t-butoxide, hafnium tetrabenzyl, hafnium (IV) acetylacetonate, hafnium (IV) pivalate, hafnium (IV) diethylcarbamate, and hafnium dichloride bis (acetylacetonate).

Preferred complexes of an atom selected from Groups 3–14 and the Lanthanides include zirconium (IV) chloride, zirconium (IV) bromide, zirconium (IV) diethylamide, and zirconium (IV) acetylacetonate. Most preferred are zirconium (IV) acetylacetonate and zirconium (IV) diethylamide.

The activating cocatalyst preferably is selected from alumoxanes such as methylalumoxane, modified methylalumoxane (MMAO), and isobutylalumoxane. Boron alkyls, boron aryls, and organoaluminum compounds such as triisobutylaluminum and diethylaluminum chloride, can also be used. The activating cocatalyst can be neat, in solution, or supported on a suitable support. Most preferred as the activating cocatalyst is MMAO in an aliphatic hydrocarbon solvent. With some catalyst compositions according to the invention, it is preferred to use a mixture of activating cocatalysts.

Optionally, the catalyst composition may also comprise an olefin adjuvant. It has been found that olefin adjuvants added to the catalyst composition during its formation increase the activity of catalyst composition. Suitable olefin adjuvants include ethylene, propylene, 1-butene, 2-butene, 1-hexene, isobutylene, diisobutylene, and dienes. Preferred are 1-butene and 1-hexene.

The catalyst composition is preferably used in unsupported, liquid form, such as a solution, dispersion, or neat liquid as described in U.S. Pat. No. 5,317,036, or formed in-situ during polymerization. It is most preferred to use the catalyst composition as a solution in one or more solvents to facilitate handling. Preferred solvents include pentane, hexane, isopentane and toluene. The catalyst components need not be soluble in the solvent(s).

The catalyst composition may also be impregnated onto a solid, inert support, spray dried as described in U.S. Pat. No. 5,648,310, or in the form of a prepolymer. In the case of a supported catalyst composition, the catalyst composition, once formed, may be impregnated in or deposited on the surface of an inert substrate such as silica, carbon black, polyethylene, polycarbonate porous crosslinked polystyrene, porous crosslinked polypropylene, alumina, thoria, zirconia, or magnesium halide (e.g., magnesium dichloride), such that the catalyst composition is between 0.1 and 90 percent by weight of the total weight of the catalyst composition and the support.

Catalyst composition assembly, i.e., contacting of the fulvene, the complex of an atom selected from Groups 3–14 and the Lanthanides, the activating cocatalyst, and optionally the olefin adjuvant, can be carried out under a variety of conditions. The order of addition and concentration of the catalyst components, and the time, temperature, solvent if used, and pressure during contacting may vary.

The catalyst components can be mixed in any order. The preferred order of addition depends on the nature of the fulvene, the complex of an atom selected from Groups 3–14 and the Lanthanides, the solvent (if used), and the activating cocatalyst, as well as the desired product.

The time of contacting the catalyst components can be varied from about 0.1 seconds to about 24 hours. The preferred time depends on the conditions but is normally around 30 minutes.

The temperature of contacting can be varied from around −80° C. to 100° C. but the preferred temperature is around 25° C.

Pressure for contacting ranges from 0 to 500 psi, preferably around atmospheric pressure.

The concentration of each catalyst component varies from 1 mM to about 10 M during contacting. For example, when contacting a fulvene, a zirconium compound, an aluminoxane, and an olefin adjuvant to make the catalyst composition, the concentration of fulvene is most preferably about 0.002 M, the concentration of zirconium is most preferably about 0.001M, the concentration of Al is most preferably about 0.1 M, and the concentration of the olefin adjuvant is most preferably about 10 volume percent during contacting.

The catalyst composition may be used for the polymerization of olefins by any suspension, solution, slurry, or gas phase process, using known equipment and reaction conditions, and is not limited to any specific type of reaction system. Generally, olefin polymerization temperatures range from about 0° C. to about 200° C. at atmospheric, subatmospheric, or superatmospheric pressures. Slurry or solution polymerization processes may utilize subatmospheric or superatmospheric pressures and temperatures in the range of about 40° C. to about 110° C. A useful liquid phase polymerization reaction system is described in U.S. Pat. No. 3,324,095. Liquid phase reaction systems generally comprise a reactor vessel to which olefin monomer and catalyst composition are added, and which contains a liquid reaction medium for dissolving or suspending the polyolefin. The liquid reaction medium may consist of the bulk liquid monomer or an inert liquid hydrocarbon that is nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose are isopentane, hexane, cyclohexane, heptane, benzene, toluene, and the like. Reactive contact between the olefin monomer and the catalyst composition should be maintained by constant stirring or agitation. The reaction medium containing the olefin polymer product and unreacted olefin monomer is withdrawn from the reactor continuously. The olefin polymer product is separated, and the unreacted olefin monomer and liquid reaction medium are recycled into the reactor.

Preferably, gas phase polymerization is employed, with superatmospheric pressures in the range of 1 to 1000 psi, preferably 50 to 400 psi, most preferably 100 to 300 psi, and temperatures in the range of 30 to 130° C., preferably 65 to 110° C. Stirred or fluidized bed gas phase reaction systems are particularly useful. Generally, a conventional gas phase, fluidized bed process is conducted by passing a stream containing one or more olefin monomers continuously through a fluidized bed reactor under reaction conditions and in the presence of catalyst composition at a velocity sufficient to maintain a bed of solid particles in a suspended condition. A stream containing unreacted monomer is withdrawn from the reactor continuously, compressed, cooled, optionally fully or partially condensed as disclosed in U.S. Pat. Nos. 4,528,790 and 5,462,999, and recycled to the reactor. Product is withdrawn from the reactor and make-up monomer is added to the recycle stream. As desired for temperature control of the system, any gas inert to the catalyst composition and reactants may also be present in the gas stream. In addition, a fluidization aid such as carbon black, silica, clay, or talc may be used, as disclosed in U.S. Pat. No. 4,994,534.

Polymerization may be carried out in a single reactor or in two or more reactors in series, and is conducted substantially in the absence of catalyst poisons. Organometallic compounds may be employed as scavenging agents for poisons to increase the catalyst activity. Examples of scavenging agents are metal alkyls, preferably aluminum alkyls, most preferably triisobutylaluminum, and aluminoxanes.

Conventional adjuvants may be included in the process, provided they do not interfere with the operation of the catalyst composition in forming the desired polyolefin. Hydrogen or a metal or non-metal hydride, e.g., a silyl hydride, may be used as a chain transfer agent in the process. Hydrogen may be used in amounts up to about 10 moles of hydrogen per mole of total monomer feed.

Olefin polymers that may be produced according to the invention include, but are not limited to, ethylene homopolymers, homopolymers of linear or branched higher alpha-olefins containing 3 to about 20 carbon atoms, and interpolymers of ethylene and such higher alpha-olefins, with densities ranging from about 0.86 to about 0.96. Suitable higher alpha-olefins include, for example, propylene, 1-butene, 1-pentene, 1-hexene, 4-methyl-1-pentene, 1-octene, and 3,5,5-trimethyl-l-hexene. Olefin polymers according to the invention may also be based on or contain conjugated or non-conjugated dienes, such as linear, branched, or cyclic hydrocarbon dienes having from about 4 to about 20, preferably 4 to 12, carbon atoms. Preferred dienes include 1,4-pentadiene, 1,5-hexadiene, 5-vinyl-2-norbornene, 1,7-octadiene, vinyl cyclohexene, dicyclopentadiene, butadiene, isobutylene, isoprene, ethylidene norbornene and the like. Aromatic compounds having vinyl unsaturation such as styrene and substituted styrenes, and polar vinyl monomers such as acrylonitrile, maleic acid esters, vinyl acetate, acrylate esters, methacrylate esters, vinyl trialkyl silanes and the like may be polymerized according to the invention as well. Specific olefin polymers that may be made according to the invention include, for example, polyethylene, polypropylene, ethylene/propylene rubbers (EPR's), ethylene/propylene/diene terpolymers (EPDM's), polybutadiene, polyisoprene and the like.

The following non-limiting examples further illustrate the invention.

EXAMPLES

Synthesis of the fulvenes was accomplished using the general procedure outlined in Stone, K. J.; Little, R. D. *J. Org. Chem.* 1984, 49, 1849.

Activity was measured in g polyethylene/mmol metal-hr 100 psi ethylene.

General Procedure for Slurry Polymerization Reactions

Polymerization experiments were conducted in a one liter, computer operated, slurry reactor with an air-operated, magnetically coupled stirrer and an outer steam-heated shell and an inner acetone heat-transfer shell.

The reactor was dried by heating to 100° C. while purging with 500 sccm of nitrogen for 30 minutes. Hexene and catalyst composition solution were then injected using disposable polypropylene syringes with 12" (18 gauge) s.s. oven-dried needles. The reactor was heated to a pre-heat temperature (usually 55° C.) and half of the modified methylalumoxane (MMAO Type 3A commercially available from Akzo Chemicals, Inc., 6.7–7.1 wt % Al in heptane) charge was added to the reactor as a cocatalyst/scavenger.

Meanwhile, the fulvene and the complex of an atom selected from Groups 3–14 and the Lanthanides were mixed with the remainder of the alumoxane in a drybox and charged to a syringe. This mixture was then injected into the reactor and the reactor sealed. If an olefin adjuvant was used, this was mixed with the fulvene/complex of an atom selected from Groups 3–14 and the Lanthanides mixture prior to contacting with the alumoxane.

Ethylene was pre-fed at 3000 sccm for one minute with stirring, then heated to reaction temperature. Ethylene was initially fed into the reactor at 40 psi higher than the reaction pressure, at which time the stirring began causing ethylene to be absorbed into the hexane. The computer maintained selected pressure and temperature for the duration of the run. At the end of the reaction, the computer cooled, depressurized and purged the system with nitrogen.

The recovered polymer was vacuum filtered through #4 paper and dried in a vacuum oven at 55° C. The dry resin was treated with 1000 ppm of B900 blended antioxidant stabilizer (1 pt. Irganox 1076 & 4 pts. Irgafos 168) and pulverized in a Waring blender before any analysis.

Examples 1–24

In Examples 1–22 a series of ethylene/1-hexene copolymers were made using the slurry polymerization technique outlined above with catalyst compositions according to the invention made from a variety of fulvenes with $Zr(NEt_2)_4$ and MMAO. Examples 23 and 24 are comparative.

In each of Examples 1–24, the catalyst composition was formed by first dissolving 50 μmol of the ligand shown in Table 1 and 9.5 mg $Zr(NEt_2)_4$ (25 μmol) in 18 mL of dry toluene in the glove box. To this solution was added 7.0 mL MMAO to make a [Zr]=1 mM stock solution. After aging 30 minutes, an appropriate aliquot of this stock solution was then injected into the reactor, which contained 600 mL of hexane, 43 mL of 1-hexene and sufficient MMAO (to make the final Al/Zr ratio 1000) at 55° C. The polymerization reaction was conducted at 75° C. under 85 psi ethylene for 30 minutes.

The results are shown in Table 1 below.

TABLE 1

| Example | ligand | μmo lZr | g PE/ mmol Zr/ 100 psi/ hr |
|---------|--------|---------|---------------------------|
| 1 | | 0.5 | 212706 |
| 2 | | 1 | 111529 |
| 3 | | 0.5 | 100235 |
| 4 | | 1.5 | 91137 |
| 5 | | 1 | 83294 |
| 6 | | 1 | 74118 |
| 7 | | 1 | 57882 |
| 8 | | 0.5 | 34824 |
| 9 | | 3 | 33569 |
| 10 | | 1 | 10824 |
| 11 | | 3 | 5804 |

TABLE 1-continued

| Example | ligand | μmo lZr | g PE/ mmol Zr/ 100 psi/ hr |
|---|---|---|---|
| | (cyclopentadienyl-CR1R2 structure) | | |
| 12 | R1 = R2 = Me | 1 | 67529 |
| 13 | R1 = methyl, R2 = 4-methyl-3-heptenyl | 1 | 56000 |
| 14 | R1 = H, R2 = t-butyl | 1.5 | 47373 |
| 15 | R1 = methyl, R2 = cyclopropyl | 1 | 30118 |
| 16 | R1 = methyl, R2 = phenyl | 2 | 12118 |
| 17 | R1 = H, R2 = phenyl | 2 | 5647 |
| 18 | R1 = methyl, R2 = 2-hydroxyethyl | 5 | 1176 |
| 19 | R1 = R2 = phenyl | 5 | less than 500 |
| 20 | R1 = H, R2 = 2-pyrrolyl | 5 | less than 500 |
| 21 | (tBu-cyclopentadienyl-isopropylidene) | 2 | less than 500 |
| 22 | (indenyl-isopropylidene) | 2 | less than 500 |
| 23* | methylcyclopentadiene | 2 | 1647 |
| 24* | t-butylcyclopentadiene | 2 | 1176 |

*comparative

Examples 25–44

In Examples 25–44 a series of ethylene/1-hexene copolymers were made using the slurry polymerization technique outlined above with catalyst compositions according to the invention made from a variety of zirconium salts, pentamethylenefulvene, and MMAO or methylaluminoxane (MAO commercially available from Akzo Chemicals, Inc.) Catalyst composition solutions were prepared and tested under the same conditions as Examples 1–24 with exceptions noted in Table 2, which gives the results.

As noted in Table 2, various aging times (i.e., contact times of catalyst composition ingredients) were used to form the catalyst compositions. In addition, some of the catalyst compositions were formed in the presence of 1-hexene as an olefin adjuvant. "%-Hexene adjuvant" is the volume percent 1-hexene in the final solution of activated catalyst composition.

TABLE 2

| Example | Zr salt | aging time (hrs) | vol % 1-hexene adjuvant | μmol cat | g PE/mmol Zr/100 psi/hr |
|---|---|---|---|---|---|
| 25 | Zr(NEt2)4 | 0.5 | 0 | 0.5 | 189647 |
| 26 | Zr(NEt2)4 | 0.5 | 0 | 0.5 | 238118 |
| 27 | Zr(NEt2)4 (1) | 0.5 | 0 | 0.3 | 289412 |
| 28 | Zr(NEt2)4 | 5 | 0 | 0.5 | 68706 |
| 29 | Zr(NEt2)4 | 0.5 | 18 | 0.5 | 46588 |
| 30 | Zr(NEt2)4 | 5 | 18 | 0.5 | 70588 |
| 31 | Zr(acac)4 | 0.5 | 0 | 5 | 9647 |
| 32 | Zr(acac)4 | 5 | 0 | 5 | 6965 |
| 33 | Zr(acac)4 | 0.5 | 37 | 5 | 18024 |
| 34 | Zr(acac)4 | 5 | 37 | 5 | 19059 |
| 35 | ZrBr4 | 0.5 | 0 | 5 | 19341 |
| 36 | ZrBr4 | 5 | 0 | 5 | 8612 |
| 37 | ZrBr4 | 0.5 | 40 | 3 | 15373 |
| 38 | ZrBr4 | 5 | 40 | 3 | 36157 |
| 39 | Zr(acac-F6)4 | 0.5 | 0 | 1 | 6118 |
| 40 | Zr(acac-F6)4 | 5 | 0 | 1.5 | 12549 |
| 41 | Zr(acac-F6)4 | 0.5 | 38 | 5 | 14635 |
| 42 | Zr(acac-F6)4 | 5 | 38 | 3 | 22353 |
| 43 | Zr(TMHD)4 | 0.5 | 0 | 0.5 | less than 500 |
| 44 | Zr(TMHD)4 | 5 | 0 | 1.5 | 17412 |

Zr(acac-F6)4 = zirconium (IV) 1,1,1,5,5,5-hexafluoro-2,4-pentandionate
Zr(TMHD)4 = zirconium (IV) tetrakis(2,2,6,6-tetramethyl-3,5-heptandionate).
(1) Used MAO instead of MMAO.

Examples 45–63

In Examples 45–63 a series of ethylene/1-hexene copolymers (except for Example 47, an ethylene homopolymer) were made using the slurry polymerization technique outlined above with catalyst compositions according to the invention made from a variety of zirconium salts, 6,6-dimethylfulvene, and MMAO or MAO. Catalyst solutions were prepared and tested under the same conditions as Examples 1–24 with exceptions noted in Table 3, which gives the results.

Various aging times (i.e., contact times of catalyst composition ingredients) were used to form the catalyst compositions.

TABLE 3

| Example | Zr salt | aging time (hrs) | fulvene/ Zr | μmol Zr | g PE/ mmol Zr/ 100 psi/hr |
|---|---|---|---|---|---|
| 45 | Zr(NEt2)4 | 0.5 | 1 | 2 | 39412 |
| 46 | Zr(NEt2)4 | 5 | 1 | 2 | 41412 |
| 47 | Zr(NEt2)4 (2) | 0.5 | 1 | 2 | 24118 |
| 48 | Zr(NEt2)4 | 0.5 | 2 | 1 | 67529 |
| 49 | Zr(NEt2)4 (1) | 0.5 | 1 | 1 | 41882 |
| 50 | Zr(NEt2)4 (1) | 0.5 | 2 | 0.5 | 149647 |
| 51 | ZrCl4 (1) | 0.5 | 2 | 5 | 4094 |
| 52 | ZrCl4 (1) | 5 | 2 | 5 | 9788 |
| 53 | ZrCl4 (1) | 0.5 | 4 | 5 | 1788 |
| 54 | ZrCl4 (1) | 5 | 4 | 5 | 5976 |
| 55 | Zr(O2CCMe3)4 | 0.5 | 1 | 2 | 8824 |
| 56 | Zr(O2CCMe3)4 | 0.5 | 2 | 2 | 19176 |
| 57 | Zr(O2CCMe3)4 | 5 | 2 | 2 | 20706 |
| 58 | Zr(O2CNiPr2)4 | 0.5 | 1 | 2 | 10824 |
| 59 | Zr(O2CNlPr2)4 | 5 | 1 | 2 | 8706 |
| 60 | Zr(acac-F6)4 | 0.5 | 1 | 5 | 18635 |
| 61 | Zr(acac-F6)4 | 5 | 1 | 5 | 17600 |
| 62 | Zr(acac-F6)4 | 0.5 | 2 | 5 | 24141 |
| 63 | Zr(acac-F6)4 | 5 | 2 | 5 | 22965 |

Zr(acac-F6)4 Zirconium (IV) 1,1,1,5,5,5-hexafluoro-2,4-pentandionate
(1) Used MAO instead of MMAO.
(2) No 1-hexene co-monomer in reactor.

Examples 64–78

In Examples 64–78 a series of ethylene/1-hexene copolymers were made using the slurry polymerization technique outlined above with catalyst compositions according to the invention made using a variety of fulvene/Zr ratios. Catalyst solutions were prepared and tested under the same conditions as Examples 1–24 with exceptions noted in Table 4, which gives the results.

TABLE 4

| Example | fulvene | Zr salt | fulvene/Zr | µmol Zr | g PE/mmol Zr/100 psi/hr |
|---|---|---|---|---|---|
| 64 | dimethylfulvene | Zr(acac-F6)4 | 1 | 5 | 18635 |
| 65 | dimethylfulvene | Zr(acac-F6)4 | 2 | 5 | 24141 |
| 66 | dimethylfulvene | Zr(NEt2)4 | 1 | 2 | 39412 |
| 67 | dimethylfulvene | Zr(NEt2)4 | 1.5 | 1.5 | 73569 |
| 68 | dimethylfulvene | Zr(NEt2)4 | 2 | 1 | 67529 |
| 69 | dimethylfulvene | Zr(NEt2)4 | 4 | 1 | 96235 |
| 70 | dimethylfulvene | ZrCl4 (1) | 2 | 5 | 4094 |
| 71 | dimethylfulvene | ZrCl4 (1) | 4 | 5 | 1788 |
| 72 | dimethylfulvene | Zr(O2CCMe3)4 | 1 | 2 | 8824 |
| 73 | dimethylfulvene | Zr(O2CCMe3)4 | 2 | 2 | 19176 |
| 74 | pentamethylenefulvene | Zr(NEt2)4 | 1 | 1 | 51765 |
| 75 | pentamethylenefulvene | Zr(NEt2)4 | 2 | 0.5 | 212706 |
| 76 | pentamethylenefulvene | Zr(NEt2)4 | 3 | 0.4 | 154706 |
| 77 | pentamethylenefulvene | ZrBr4 | 1 | 6 | 1333 |
| 78 | pentamethylenefulvene | ZrBr4 | 2 | 5 | 19341 |

Zr(acac-F6)4 = Zirconium (IV) 1,1,1,5,5,5-hexafluoropentandionate
(1) Used MAO instead of MMAO Examples 79–82

In Examples 79–82, a series of ethylene/1-hexene copolymers were made using the slurry polymerization technique outlined above with catalyst compositions according to the invention made by contacting mixtures of pentamethylenefulvene (A) and 6-methyl-6-phenylfulvene (B) with $Zr(NEt_2)_4$ and MMAO (2 moles fulvenes A+B/1 mole Zr).

Catalyst solutions were prepared and tested under the same conditions as Examples 1–24 with exceptions noted in Table 5, which gives the results.

TABLE 5

| Example | ratio A/B | µmol Zr | g PE/mmol Zr/100 psi/hr |
|---|---|---|---|
| 79 | 1/8 | 6 | 3529 |
| 80 | 1/4 | 3 | 9569 |
| 81 | 1/2 | 1.5 | 27922 |
| 82 | 1/1 | 1.5 | 64314 |

Examples 83–100

In Examples 83–100, a series of ethylene/1-hexene copolymers were made using the slurry polymerization technique outlined above with catalyst compositions according to the invention made using 1) varios contact times between the fulvene/zirconium compound mixture and cocatalyst, 2) various zirconium concentrations, and 3) varios amounts of olefin adjuvant. Pentamethylenefulvene was used as the fulvene, with a 2/1 mole ratio of fulvene to Zr. MMAO or MAO was used as the cocatalyst. Catalyst composition solutions were prepared and under the same conditions as Examples 1–24 with exceptions noted in Table 6.

TABLE 6

| Example | Zr salt | contact time (hrs) | [Zr] (mM) | % 1-hexene adjuvant | µmol cat | g PE/mmol Zr/100 psi/hr |
|---|---|---|---|---|---|---|
| 83 | Zr(NEt2)4 | 0.17 | 3.5 | 0 | 0.5 | 172706 |
| 84 | Zr(NEt2)4 | 0.5 | 3.5 | 0 | 0.5 | 238118 |
| 85 | Zr(NEt2)4 | 1 | 3.5 | 0 | 0.5 | 141647 |
| 86 | Zr(NEt2)4 | 0.5 | 1 | 0 | 0.5 | 214588 |
| 87 | Zr(NEt2)4 | 5 | 1 | 0 | 0.5 | 68706 |
| 88 | Zr(NEt2)4 | 0.5 | 3.5 | 20 | 0.5 | 46588 |
| 89 | Zr(NEt2)4 | 5 | 3.5 | 20 | 0.5 | 70588 |
| 90 | Zr(acac-F6)4 | 0.5 | 1 | 0 | 1 | 6118 |
| 91 | Zr(acac-F6)4 | 5 | 1 | 0 | 1.5 | 12549 |
| 92 | Zr(acac-F6)4 | 0.5 | 1 | 37 | 5 | 14635 |
| 93 | Zr(acac-F6)4 | 5 | 1 | 37 | 3 | 22353 |
| 94 | Zr(acac)4 | 0.5 | 1 | 0 | 5 | 9647 |
| 95 | Zr(acac)4 | 0.5 | 1 | 37 | 5 | 18024 |
| 96 | Zr(acac)4 | 5 | 1 | 37 | 5 | 19059 |
| 97 | ZrBr4 | 0.5 | 1 | 0 | 5 | 19341 |
| 98 | ZrBr4 | 5 | 1 | 0 | 5 | 8612 |
| 99 | ZrBr4 | 0.5 | 1 | 37 | 3 | 15373 |
| 100 | ZrBr4 | 5 | 1 | 37 | 3 | 36157 |

Zr(acac-F6)4 = Zirconium (IV) 1,1,1,5,5,5-hexafluoro-2,4-pentandionate
(1) Used MAO instead of MMAO Example 101

A 2/1 pentamethylenefulvene/$Zr(NEt_2)_4$ solution, 0.05M Zr in hexane solvent, was mixed in-line with MMAO and was used as the catalyst composition to produce an ethylene/1-hexene copolymer (density 0.917, 1.0 melt index) in a pilot-scale, fluidized bed, gas phase reactor. The reactor was nominally 14 inches in diameter and was operated with a bed height of 6 feet and a superficial gas velocity of approximately 2 ft/sec. Total reactor pressure was 350 psig.

First, a seed bed was charged to the reactor and it was dried to less than 10 ppm water. The reactor was pressurized to 150 psig of nitrogen and then 200 cc/hr of 5% teal in isopentane were fed to the reactor over one hour and allowed to circulate for one hour. The 1-hexene/ethylene mole ratio in the reactor was established at 0.025 and the temperature was 75° C.

The catalyst composition was made by mixing a 2/1 pentamethylenefulvene/$Zr(NEt_2)_4$ solution, 0.05M Zr in hexane solvent, with MMAO (type 3A, 3.4 wt % Al, commercially available from Akzo Chemicals, Inc.). Additional dilution of the catalyst composition was performed by adding hexane to the mixture. The catalyst composition in liquid form was sprayed into the reactor through a catalyst injection tube with the aid of an atomizing nitrogen flow and a cycle gas purge flow diverted from the rest of the cycle gas.

The reactor was started up as described above and then operated at the following conditions:

| | |
|---|---|
| Temperature: | 75° C. |
| Pressure: | 350 psig |
| Ethylene Partial Pressure: | 220 psi |
| Bed Weight: | 100 lbs |
| 1-hexene to ethylene molar ratio: | 0.022 |
| Hydrogen concentration: | 200–300 ppm |

The activity of the catalyst composition was dependent on the contact time between MMAO and the pentamethylenefulvene/$Zr(Et_2)_4$ mixture. Table 7 summarizes nthe changes inn activity with changing contact time.

TABLE 7

| Contact Time | Less than 5 minutes | 30 to 40 minutes |
|---|---|---|
| Zr ppmw | 7.72 | 3 |
| gPE/mmole Zr/hr/100 C2 psi | 1534 | 3000 |

I claim:

1. A process for the polymerization of olefins, which comprises contacting under polymerization conditions one or more olefins with a catalyst composition comprising the reaction product of:

a) a fulvene of the formula:

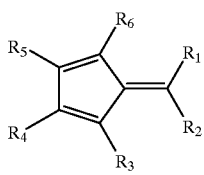

including oligomers thereof,
wherein each $R_1$, $R_2$, $R_3$, $R_4$, $R_5$, and $R_6$ is independently hydrogen, hydrocarbyl, or a heteroatom-containing group; and any two or more $R_{1-6}$ groups may be joined to form a ring;

b) a complex of the formula $[L_m MX_n]_r$ wherein each L is a neutral ligand selected from the group consisting of diethylether, tetrahydrofuran, triethylamine and pyridine, M is a metal selected from Groups 3 to 6 and the Lanthanides, each X is an anionic group selected from the group consisting of alkoxide, amide, acetylacetonate, carbamate, amidate and aluminate groups, m is an integer of 0 or greater, n is an integer of 0 or greater selected to provide charge neutrality in the complex, and r is an integer of 1 or greater; and c) an activating cocatalyst.

2. The process of claim 1, wherein the fulvene is a 6,6-dialkylfulvene.

3. The process of claim 1, wherein the fulvene is selected from the group consisting of 6,6-dimethylfulvene, 6-t-butylfulvene, 6-methyl-6-phenylfulvene, 6,6-tetramethylenefulvene, and 6,6-pentamethylenefulvene.

4. The process of claim 1, wherein M from a Group 4 metal.

5. The process of claim 1, wherein the fulvene is 6,6-pentamethylenefulvene, the complex is a zirconium (IV) acetylacetonate- or zirconium (IV) diethylamide-complex, and the activating cocatalyst is modified methylaluminoxane.

6. The process of claim 1, wherein the catalyst composition is in liquid form.

7. The process of claim 1, wherein the catalyst composition further comprises an olefin adjuvant.

8. The process of claim 7, wherein the olefin adjuvant is ethylene, propylene, 1-butene, 2-butene, 1-hexene, isobutylene, diisobutylene or a diene.

9. The process of claim 8, wherein the olefin adjuvant is 1-butene or 1-hexene.

10. The process of claim 1 conducted in the gas phase.

11. A process for the polymerization of olefins, which comprises contacting under polymerization conditions one or more olefins with a catalyst composition comprising the reaction product of:

a) a fulvene of the formula:

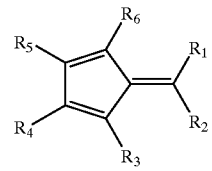

including oligomers thereof,
wherein each $R_1$, $R_2$, $R_3$, $R_4$, $R_5$, and $R_6$ is independently hydrogen, hydrocarbyl, or a heteroatom-containing group; and any two or more $R_{1-6}$ groups may be joined to form a ring;

b) a complex of the formula $[L_m MX_n]_r$ wherein each L is a neutral ligand, M is a metal selected from Groups 3 to 6 and the Lanthanides, each X is an anionic group, m is an integer of 0 or greater, n is an integer of 0 or greater selected to provide charge neutrality in the complex, and r is an integer of 1 or greater;

c) an olefin adjuvant; and d) an activating cocatalyst with the proviso that the olefin adjuvant is contacted with a) and b) prior to contact with d).

12. The process of claim 11, wherein the fulvene is a 6,6-dialkylfulvene.

13. The process of claim 11, wherein the fulvene is selected from the group consisting of 6,6-dimethylfulvene, 6-t-butylfulvene, 6-methyl-6-phenylfulvene, 6,6-tetramethylenefulvene, and 6,6-pentamethylenefulvene.

14. The process of claim 11, wherein M is a Group 4 metal.

15. The process of claim 11, wherein the fulvene is 6,6-pentamethylenefulvene, the complex is a zirconium (IV) acetylacetonate- or zirconium (IV) diethylamide-complex, and the activating cocatalyst is modified methylaluminoxane.

16. The process of claim 11, wherein the catalyst composition is in liquid form.

17. The process of claim 11, wherein the olefin adjuvant is ethylene, propylene, 1-butene, 2-butene, 1-hexene, isobutylene, diisobutylene or a diene.

18. The process of claim 11, wherein the olefin adjuvant is 1-butene or 1-hexene.

19. The process of claim 11, wherein ethylene and optionally a higher alpha-olefin selected from the group consisting of propylene, 1-butene, 1-pentene, 1-hexene, 4-methyl-1-pentene, 1-octene, and 3,5,5-trimethyl-1-hexene is polymerized.

20. The process of claim 11 conducted in the gas phase.

* * * * *